(12) United States Patent
Dighe et al.

(10) Patent No.: US 9,135,191 B1
(45) Date of Patent: Sep. 15, 2015

(54) TECHNIQUES FOR STORAGE NETWORK BANDWIDTH MANAGEMENT

(75) Inventors: Sumit Raghunath Dighe, Shrigonda (IN); Shailesh Vaman Marathe, Pune (IN); Niranjan Sanjiv Pendharkar, Pune (IN)

(73) Assignee: Symantec Corporation, Mountain View, CA (US)

( * ) Notice: Subject to any disclaimer, the term of this patent is extended or adjusted under 35 U.S.C. 154(b) by 0 days.

(21) Appl. No.: 13/525,012

(22) Filed: Jun. 15, 2012

(51) Int. Cl.
*G06F 13/14* (2006.01)
*G06F 13/16* (2006.01)

(52) U.S. Cl.
CPC .................... *G06F 13/161* (2013.01)

(58) Field of Classification Search
CPC combination set(s) only.
See application file for complete search history.

(56) References Cited

U.S. PATENT DOCUMENTS

| | | | |
|---|---|---|---|
| 7,624,221 B1* | 11/2009 | Case | 710/310 |
| 7,640,231 B2* | 12/2009 | Alvarez et al. | 1/1 |
| 7,730,269 B2* | 6/2010 | Burckart et al. | 711/154 |
| 8,667,494 B1* | 3/2014 | Riordan et al. | 718/104 |
| 2004/0193397 A1* | 9/2004 | Lumb et al. | 703/24 |
| 2009/0006720 A1* | 1/2009 | Traister | 711/103 |
| 2010/0254173 A1* | 10/2010 | Zhou et al. | 365/63 |
| 2012/0203986 A1* | 8/2012 | Strasser et al. | 711/158 |

* cited by examiner

*Primary Examiner* — Ilwoo Park
(74) *Attorney, Agent, or Firm* — Wilmer Cutler Pickering Hale and Dorr LLP

(57) ABSTRACT

Techniques for storage network bandwidth management are disclosed. In one particular exemplary embodiment, the techniques may be realized as a method for storage network bandwidth management comprising sampling, using at least one computer processor, application Input/Output (I/O) requests associated with the unit of storage during a specified period of time, determining a maximum latency value based on the sampling of the application Input/Output (I/O) requests, comparing the maximum latency value with a current latency value, and throttling administrative I/O requests in the event that the current latency value exceeds the maximum latency value.

19 Claims, 4 Drawing Sheets

TECHNIQUES FOR STORAGE NETWORK BANDWIDTH MANAGEMENT

FIELD OF THE DISCLOSURE

The present disclosure relates generally to managing computer storage networks and, more particularly, to techniques for storage network bandwidth management.

BACKGROUND OF THE DISCLOSURE

Logical volume management may provide storage virtualization and offers storage flexibility to allow partition concatenating, striping, resizing, movement or other partition operations. Such volume management operations may be carried out without interruption to operations. However, such volume management operations may require significant administrative I/O. Such I/O transactions may be unrelated to I/O transactions of applications using the corresponding partitions. For example, if a volume is striped by a logical volume manager, such striping may not interrupt I/O operations of an application using the volume being striped. However, the administrative I/O may cause a significant delay and may impair performance of the application. Attempts to manage the administrative I/O requests may also impact the I/O requests of the application.

In view of the foregoing, it may be understood that there may be significant problems and shortcomings associated with current computer storage network management technologies.

SUMMARY OF THE DISCLOSURE

Techniques for storage network bandwidth management are disclosed. In one particular exemplary embodiment, the techniques may be realized as a method for storage network bandwidth management comprising sampling, using at least one computer processor, application Input/Output (I/O) requests associated with the unit of storage during a specified period of time, determining a maximum latency value based on the sampling of the application Input/Output (I/O) requests, comparing the maximum latency value with a current latency value, and throttling administrative I/O requests in the event that the current latency value exceeds the maximum latency value.

In accordance with other aspects of this particular exemplary embodiment, the techniques may further include periodically sampling application Input/Output (I/O) requests to determine a new maximum latency value.

In accordance with further aspects of this particular exemplary embodiment, the techniques may further include increasing administrative Input/Output (I/O) requests in the event the current latency value is a specified level below the maximum latency value.

In accordance with additional aspects of this particular exemplary embodiment, the first unit of storage may comprise a volume.

In accordance with additional aspects of this particular exemplary embodiment, the first unit of storage may comprise a disk.

In accordance with additional aspects of this particular exemplary embodiment, the first unit of storage may comprise a disk array.

In accordance with additional aspects of this particular exemplary embodiment, the techniques may further include comparing the current latency value with a maximum latency value associated with a second unit of storage, wherein throttling administrative I/O requests may comprise throttling administrative I/O requests in the event that the current latency value exceeds either the maximum latency value of the first unit of storage or the maximum latency value of the second unit of storage.

In accordance with additional aspects of this particular exemplary embodiment, the comparison may be based upon an administrative operation occurring which requires writing from the first unit of storage to the second unit of storage.

In accordance with additional aspects of this particular exemplary embodiment, throttling administrative I/O requests may be implemented using a sliding window protocol.

In accordance with additional aspects of this particular exemplary embodiment, the periodic sampling may result in a plurality of stored maximum latency values used to identify bandwidth utilization trends.

In accordance with additional aspects of this particular exemplary embodiment, I/O requests of an application may be differentiated from administrative I/O requests based on a field in a packet header of administrative I/O request packets.

In accordance with additional aspects of this particular exemplary embodiment, the techniques may be realized as at least one non-transitory processor readable storage medium for storing a computer program of instructions configured to be readable by at least one processor for instructing the at least one processor to execute a computer process for performing a method.

In another particular exemplary embodiment, the techniques may be realized as an article of manufacture for storage network bandwidth management. The article of manufacture may comprise at least one non-transitory processor readable medium and instructions stored on the at least one medium. The instructions may be configured to be readable from the at least one medium by at least one processor and thereby cause the at least one processor to operate so as to sample application Input/Output (I/O) requests associated with the unit of storage during a specified period of time, determine a maximum latency value based on the sampling of the application Input/Output (I/O) requests, compare the maximum latency value with a current latency value, and throttle administrative I/O requests in the event that the current latency value exceeds the maximum latency value.

In yet another particular exemplary embodiment, the techniques may be realized as a system for storage network bandwidth management comprising one or more processors communicatively coupled to a network. The one or more processors may be configured to sample application Input/Output (I/O) requests associated with the unit of storage during a specified period of time, determine a maximum latency value based on the sampling of the application Input/Output (I/O) requests, compare the maximum latency value with a current latency value and throttle administrative I/O requests in the event that the current latency value exceeds the maximum latency value.

In accordance with additional aspects of this particular exemplary embodiment, the one or more processors may be further configured to periodically sample application Input/Output (I/O) requests to determine a new maximum latency value.

In accordance with additional aspects of this particular exemplary embodiment, the one or more processors may be further configured to increase administrative Input/Output (I/O) requests in the event the current latency value is a specified level below the maximum latency value.

In accordance with additional aspects of this particular exemplary embodiment, the first unit of storage may comprise at least one of a volume, a disk, and a disk array.

In accordance with additional aspects of this particular exemplary embodiment, the one or more processors may be further configured to compare the current latency value with a maximum latency value associated with a second unit of storage, wherein throttling administrative I/O requests comprises throttling administrative I/O requests in the event that the current latency value exceeds either the maximum latency value of the first unit of storage or the maximum latency value of the second unit of storage.

In accordance with additional aspects of this particular exemplary embodiment, the comparison may be based upon an administrative operation occurring which requires writing from the first unit of storage to the second unit of storage.

In accordance with additional aspects of this particular exemplary embodiment, throttling administrative I/O requests may be implemented using a sliding window protocol.

The present disclosure will now be described in more detail with reference to exemplary embodiments thereof as shown in the accompanying drawings. While the present disclosure is described below with reference to exemplary embodiments, it should be understood that the present disclosure is not limited thereto. Those of ordinary skill in the art having access to the teachings herein will recognize additional implementations, modifications, and embodiments, as well as other fields of use, which are within the scope of the present disclosure as described herein, and with respect to which the present disclosure may be of significant utility.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be exemplary only.

DETAILED DESCRIPTION OF EXEMPLARY EMBODIMENTS

Figure 1:
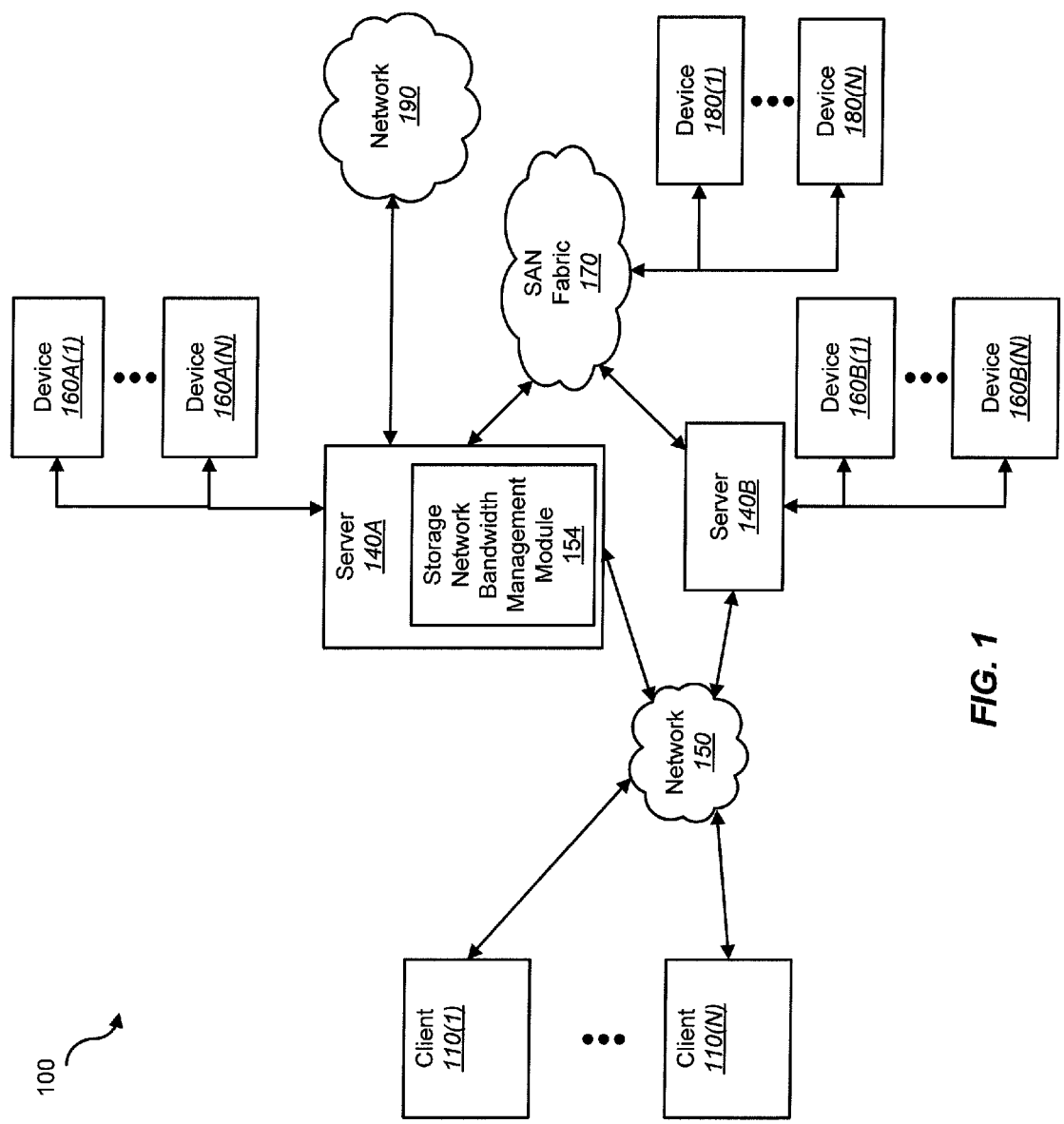
FIG. 1 shows a block diagram depicting a network architecture containing a platform for storage network bandwidth management in accordance with an embodiment of the present disclosure.

FIG. 1 shows a block diagram depicting a network architecture 100 for storage network bandwidth management in accordance with an embodiment of the present disclosure. FIG. 1 is a simplified view of network architecture 100, which may include additional elements that are not depicted. Network architecture 100 may contain client systems 110(1)-110(N) as well as servers 140A and 140B (one or more of which may be implemented using computer system 200 shown in FIG. 2). Client systems 110(1)-110(N) may be communicatively coupled to a network 150. Server 140A may be communicatively coupled to storage devices 160A(1)-(N), and server 140B may be communicatively coupled to storage devices 160B(1)-(N). Servers 140A and 140B may be communicatively coupled to a SAN (Storage Area Network) fabric 170. SAN fabric 170 may support access to storage devices 180(1)-(N) by servers 140A and 140B, and by client systems 110(1)-110(N) via network 150. Server 140A may be communicatively coupled to network 190.

The description below describes network elements, computers, and/or components of a system and method for storage network bandwidth management that may include one or more modules. As used herein, the term "module" may be understood to refer to computing software, firmware, hardware, and/or various combinations thereof. Modules, however, are not to be interpreted as software which is not implemented on hardware, firmware, or recorded on a processor readable recordable storage medium (i.e., modules are not software per se). It is noted that the modules are exemplary. The modules may be combined, integrated, separated, and/or duplicated to support various applications. Also, a function described herein as being performed at a particular module may be performed at one or more other modules and/or by one or more other devices instead of or in addition to the function performed at the particular module. Further, the modules may be implemented across multiple devices and/or other components local or remote to one another. Additionally, the modules may be moved from one device and added to another device, and/or may be included in both devices.

Figure 2:
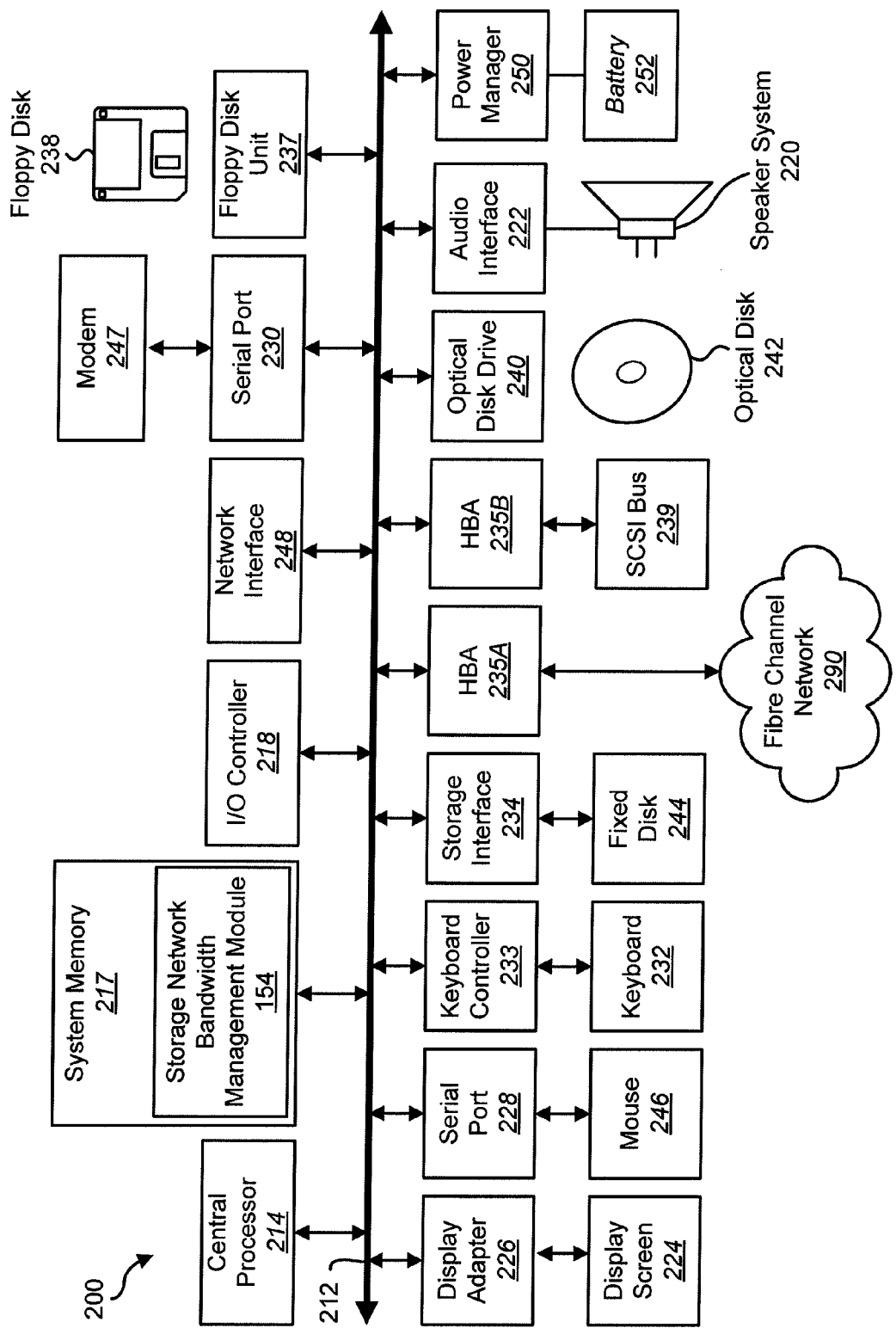
FIG. 2 depicts a block diagram of a computer system in accordance with an embodiment of the present disclosure.

With reference to computer system 200 of FIG. 2, modem 247, network interface 248, or some other method may be used to provide connectivity from one or more of client systems 110(1)-110(N) to network 150. Client systems 110(1)-110(N) may be able to access information on server 140A or 140B using, for example, a web browser or other client software. Such a client may allow client systems 110(1)-110(N) to access data hosted by server 140A or 140B or one of storage devices 160A(1)-(N), 160B(1)-(N), and/or 180(1)-(N).

Networks 150 and 190 may be local area networks (LANs), wide area networks (WANs), the Internet, cellular networks, satellite networks, or other networks that permit communication between client systems 110(1)-110(N), servers 140, and other devices communicatively coupled to networks 150 and 190. Networks 150 and 190 may further include one, or any number, of the exemplary types of networks mentioned above operating as a stand-alone network or in cooperation with each other. Networks 150 and 190 may utilize one or more protocols of one or more clients or servers to which they are communicatively coupled. Networks 150 and 190 may translate to or from other protocols to one or more protocols of network devices. Although networks 150 and 190 are each depicted as one network, it should be appreciated that according to one or more embodiments, networks 150 and 190 may each comprise a plurality of interconnected networks.

Storage devices 160A(1)-(N), 160B(1)-(N), and/or 180(1)-(N) may be network accessible storage and may be local, remote, or a combination thereof to server 140A or 140B. Storage devices 160A(1)-(N), 160B(1)-(N), and/or 180(1)-(N) may utilize a redundant array of inexpensive disks ("RAID"), magnetic tape, disk, a storage area network ("SAN"), an internet small computer systems interface ("iSCSI") SAN, a Fibre Channel SAN, a common Internet File System ("CIFS"), network attached storage ("NAS"), a network file system ("NFS"), optical based storage, or other computer accessible storage. Storage devices 160A(1)-(N), 160B(1)-(N), and/or 180(1)-(N) may be used for backup or archival purposes.

According to some embodiments, client systems 110(1)-110(N) may be a smartphone, PDA, desktop computer, a laptop computer, a server, another computer, or another device coupled via a wireless or wired connection to network 150. Client systems 110(1)-110(N) may receive data from user input, a database, a file, a web service, and/or an application programming interface.

Servers 140A and 140B may be application servers, archival platforms, backup servers, network storage devices, media servers, email servers, document management platforms, enterprise search servers, or other devices communicatively coupled to network 150. Servers 140A and 140B may utilize one of storage devices 160A(1)-(N), 160B(1)-(N), and/or 180(1)-(N) for the storage of application data, backup data, or other data. Servers 140A and 140B may be hosts, such as an application server, which may process data traveling between client systems 110(1)-110(N) and a backup platform, a backup process, and/or storage. According to some embodiments, servers 140A and 140B may be platforms used for backing up and/or archiving data.

Client systems 110(1)-110(N) may contain storage network bandwidth management module 154. Storage network bandwidth management module 154 may provide storage network bandwidth management services for a plurality of units of storage. Storage network bandwidth management module 154 may determine or be configured for a particular unit of storage. According to some embodiments a unit of storage may be one or more of a volume, a disk, and a disk array. Storage network bandwidth management module 154 may non-disruptively sample application Input/Output (I/O) requests associated with the unit of storage during a specified period of time. According to some embodiments, administrative I/O requests may be differentiated from application I/O requests based on a field in a packet header of administrative I/O request packets. Storage network bandwidth management module 154 may determine a maximum latency value for the sampling period. For example, a maximum latency value may be specified as a percentage of an average observed latency during a sampling period (e.g., 120%). A maximum latency value may also be specified in another manner (e.g., a table mapping sampled latency ranges to maximum latency values, a table mapping a number of I/O requests to a maximum latency value, etc.) Storage network bandwidth management module 154 may periodically measure latency of I/O requests and may compare the maximum latency value with a current latency value. If a current latency value exceeds a maximum latency value then storage network bandwidth management module 154 may throttle administrative I/O requests. According to one or more embodiments, throttling administrative I/O requests may be implemented using a sliding window protocol. In the event a currently latency value is a specified level below a maximum latency value, storage network bandwidth management module 154 may increase administrative Input/Output (I/O) requests. Increases in administrative Input/Output (I/O) requests may be proportional to an amount a currently observed application I/O latency falls below a maximum specified I/O latency. For example, if application I/O latency is twenty percent below a specified maximum application I/O latency, then administrative I/O requests may be increased by twenty percent. According to some embodiments, a margin may be left (e.g., the administrative I/O may be increased by only 10% and a 10% safety margin may be left). Increases in administrative I/O requests may also be calculated using other factors (e.g., a mapping table, a cap, etc.)

According to one or more embodiments, storage network bandwidth management module 154 may consider the latency values of more than one unit of storage when managing administrative I/O bandwidth use. For example, storage network bandwidth management module 154 may compare a current latency value with a maximum latency value associated with a second unit of storage. Throttling administrative I/O requests may include throttling administrative I/O requests in the event that the current latency value exceeds either the maximum latency value of the first unit of storage or the maximum latency value of the second unit of storage. Storage network bandwidth management module 154 may compare latency of one or more units of storage with one or more latency values based upon an administrative operation occurring which writes from the first unit of storage to the second unit of storage. Storage network bandwidth management module 154 may throttle administrative I/O requests of operations involving a plurality of units of storage to address a lowest latency value of the plurality of units of storage.

Storage network bandwidth management module 154 may throttle administrative I/O requests using one or more methods. For example, storage network bandwidth management module 154 may use tokens or a sliding window, weighted queuing, and/or a weighted round robin methodology.

Throttling administrative I/O requests in the event that a current latency value exceeds the maximum latency value may include decreasing administrative I/O requests at a rate proportional to a rate at which the current latency value exceeds the maximum latency value. For example, if a current latency value exceeds a maximum latency value by ten percent, administrative I/O requests may be decreased by ten percent. Throttling administrative I/O requests may also use other calculations such as, for example, mapping a current latency value to a specified number of administrative I/O requests.

Storage network bandwidth management module 154 may periodically sample application Input/Output (I/O) requests to determine a new maximum latency value. For example, a maximum latency value may be specified as a percentage of an average observed latency during a sampling period (e.g., 120%). A maximum latency value may also be specified in another manner (e.g., a table mapping sampled latency ranges to maximum latency values, a table mapping a number of I/O requests to a maximum latency value, etc.) According to some embodiments, storage network bandwidth management module 154 may sample I/O requests every three hours to determine a new maximum latency value. According to some embodiments, Storage network bandwidth management module 154 or logical volume management software may trigger sampling if an I/O intensive administrative operation has been triggered. According to one or more embodiments, statistics may be maintained of different periods or trends of I/O levels and corresponding latency.

FIG. 2 depicts a block diagram of a computer system 200 in accordance with an embodiment of the present disclosure. Computer system 200 is suitable for implementing techniques in accordance with the present disclosure. Computer system 200 may include a bus 212 which may interconnect major subsystems of computer system 210, such as a central processor 214, a system memory 217 (e.g. RAM (Random Access Memory), ROM (Read Only Memory), flash RAM, or the like), an Input/Output (I/O) controller 218, an external audio device, such as a speaker system 220 via an audio output interface 222, an external device, such as a display screen 224 via display adapter 226, serial ports 228 and 230, a keyboard 232 (interfaced via a keyboard controller 233), a storage interface 234, a floppy disk drive 237 operative to receive a floppy disk 238, a host bus adapter (HBA) interface card 235A operative to connect with a Fibre Channel network 290, a host bus adapter (HBA) interface card 235B operative to connect to a SCSI bus 239, and an optical disk drive 240 operative to receive an optical disk 242. Also included may be a mouse 246 (or other point-and-click device, coupled to bus 212 via serial port 228), a modem 247 (coupled to bus 212 via serial port 230), network interface 248 (coupled directly to bus 212), power manager 250, and battery 252.

Bus 212 allows data communication between central processor 214 and system memory 217, which may include read-only memory (ROM) or flash memory (neither shown), and random access memory (RAM) (not shown), as previously noted. The RAM may be the main memory into which the operating system and application programs may be loaded. The ROM or flash memory can contain, among other code, the Basic Input-Output system (BIOS) which controls basic hardware operation such as the interaction with peripheral components. Applications resident with computer system 210 may be stored on and accessed via a computer readable medium, such as a hard disk drive (e.g., fixed disk 244), an optical drive (e.g., optical drive 240), a floppy disk unit 237, or other storage medium. For example, storage network bandwidth management 154 may be resident in system memory 217.

Storage interface 234, as with the other storage interfaces of computer system 210, can connect to a standard computer readable medium for storage and/or retrieval of information, such as a fixed disk drive 244. Fixed disk drive 244 may be a part of computer system 210 or may be separate and accessed through other interface systems. Modem 247 may provide a direct connection to a remote server via a telephone link or to the Internet via an internet service provider (ISP). Network interface 248 may provide a direct connection to a remote server via a direct network link to the Internet via a POP (point of presence). Network interface 248 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 2 need not be present to practice the present disclosure. The devices and subsystems can be interconnected in different ways from that shown in FIG. 2. Code to implement the present disclosure may be stored in computer-readable storage media such as one or more of system memory 217, fixed disk 244, optical disk 242, or floppy disk 238. Code to implement the present disclosure may also be received via one or more interfaces and stored in memory. The operating system provided on computer system 210 may be MS-DOS®, MS-WINDOWS®, OS/2®, OS X®, UNIX®, Linux®, or another known operating system.

Power manager 250 may monitor a power level of battery 252. Power manager 250 may provide one or more APIs (Application Programming Interfaces) to allow determination of a power level, of a time window remaining prior to shutdown of computer system 200, a power consumption rate, an indicator of whether computer system is on mains (e.g., AC Power) or battery power, and other power related information. According to some embodiments, APIs of power manager 250 may be accessible remotely (e.g., accessible to a remote backup management module via a network connection). According to some embodiments, battery 252 may be an Uninterruptable Power Supply (UPS) located either local to or remote from computer system 200. In such embodiments, power manager 250 may provide information about a power level of an UPS.

Figure 3:
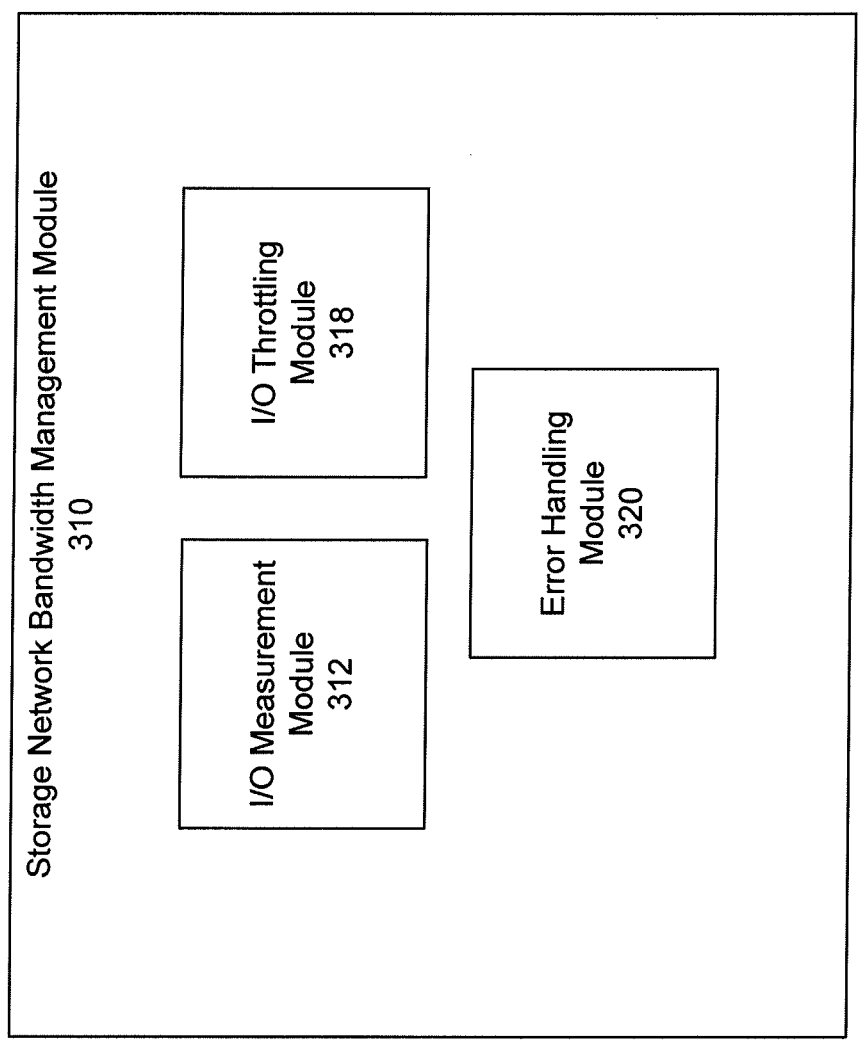
FIG. 3 shows a module for storage network bandwidth management in accordance with an embodiment of the present disclosure.

Referring to FIG. 3, there is shown a storage network bandwidth management module 310 in accordance with an embodiment of the present disclosure. As illustrated, the storage network bandwidth management module 310 may contain one or more components including I/O measurement module 312, reference determination module 314, I/O throttling module 318, and error handling module 320.

I/O measurement module 312 may non-disruptively sample application Input/Output (I/O) requests associated with the unit of storage during a specified period of time. According to some embodiments, administrative I/O requests may be differentiated from application I/O requests based on a field in a packet header of administrative I/O request packets. I/O measurement module 312 may determine a maximum latency value for the sampling period. For example, a maximum latency value may be specified as a percentage of an average observed latency during a sampling period (e.g., 120%). A maximum latency value may also be specified in another manner (e.g., a table mapping sampled latency ranges to maximum latency values, a table mapping a number of I/O requests to a maximum latency value, etc.) I/O measurement module 312 may periodically measure latency of I/O requests and may compare the maximum latency value with a current latency value.

According to one or more embodiments, I/O measurement module 312 may consider the latency values of more than one unit of storage when managing administrative I/O bandwidth use. For example, I/O measurement module 312 may compare a current latency value with a maximum latency value associated with a second unit of storage. I/O measurement module 312 may compare latency of one or more units of storage with one or more latency values based upon an administrative operation occurring which writes from the first unit of storage to the second unit of storage.

I/O measurement module 312 may periodically sample Input/Output (I/O) requests to determine a new maximum latency value. For example, according to some embodiments, I/O measurement module 312 may sample I/O requests every three hours to determine a new maximum latency value. According to some embodiments, I/O measurement module 312 or logical volume management software may trigger sampling if an I/O intensive administrative operation has been triggered. According to one or more embodiments, statistics may be maintained of different periods or trends of I/O levels and corresponding latency.

If a current latency value exceeds a maximum latency value then I/O throttling module 318 may throttle administrative I/O requests. According to one or more embodiments, throttling administrative I/O requests may be implemented using a sliding window protocol. In the event a currently latency value is a specified level below a maximum latency value, I/O throttling module 318 may increase administrative Input/Output (I/O) requests.

Increases in administrative Input/Output (I/O) requests may be proportional to an amount a currently observed application I/O latency falls below a maximum specified I/O latency. For example, if application I/O latency is twenty percent below a specified maximum application I/O latency, then administrative I/O requests may be increased by twenty percent. According to some embodiments, a margin may be left (e.g., the administrative I/O may be increased by only 10% and a 10% safety margin may be left). Increases in administrative I/O requests may also be calculated using other factors (e.g., a mapping table, a cap, etc.)

I/O throttling module 318 may throttle administrative I/O requests of operations involving a plurality of units of storage to address a lowest latency value of the plurality of units of storage. Throttling administrative I/O requests may include throttling administrative I/O requests in the event that the current latency value exceeds either the maximum latency value of the first unit of storage or the maximum latency value of the second unit of storage.

Throttling administrative I/O requests in the event that a current latency value exceeds the maximum latency value may include decreasing administrative I/O requests at a rate proportional to a rate at which the current latency value exceeds the maximum latency value. For example, if a current latency value exceeds a maximum latency value by ten percent, administrative I/O requests may be decreased by ten percent. Throttling administrative I/O requests may also use other calculations such as, for example, mapping a current latency value to a specified number of administrative I/O requests.

I/O throttling module 318 may throttle administrative I/O requests using one or more methods. For example, I/O throttling module 318 may use tokens or a sliding window, weighted queuing, and/or a weighted round robin methodology.

Error handling module 320 may handle one or more errors with storage network bandwidth management including, but not limited to, errors with I/O measurement, administrative I/O throttling, and periodic I/O sampling.

Figure 4:
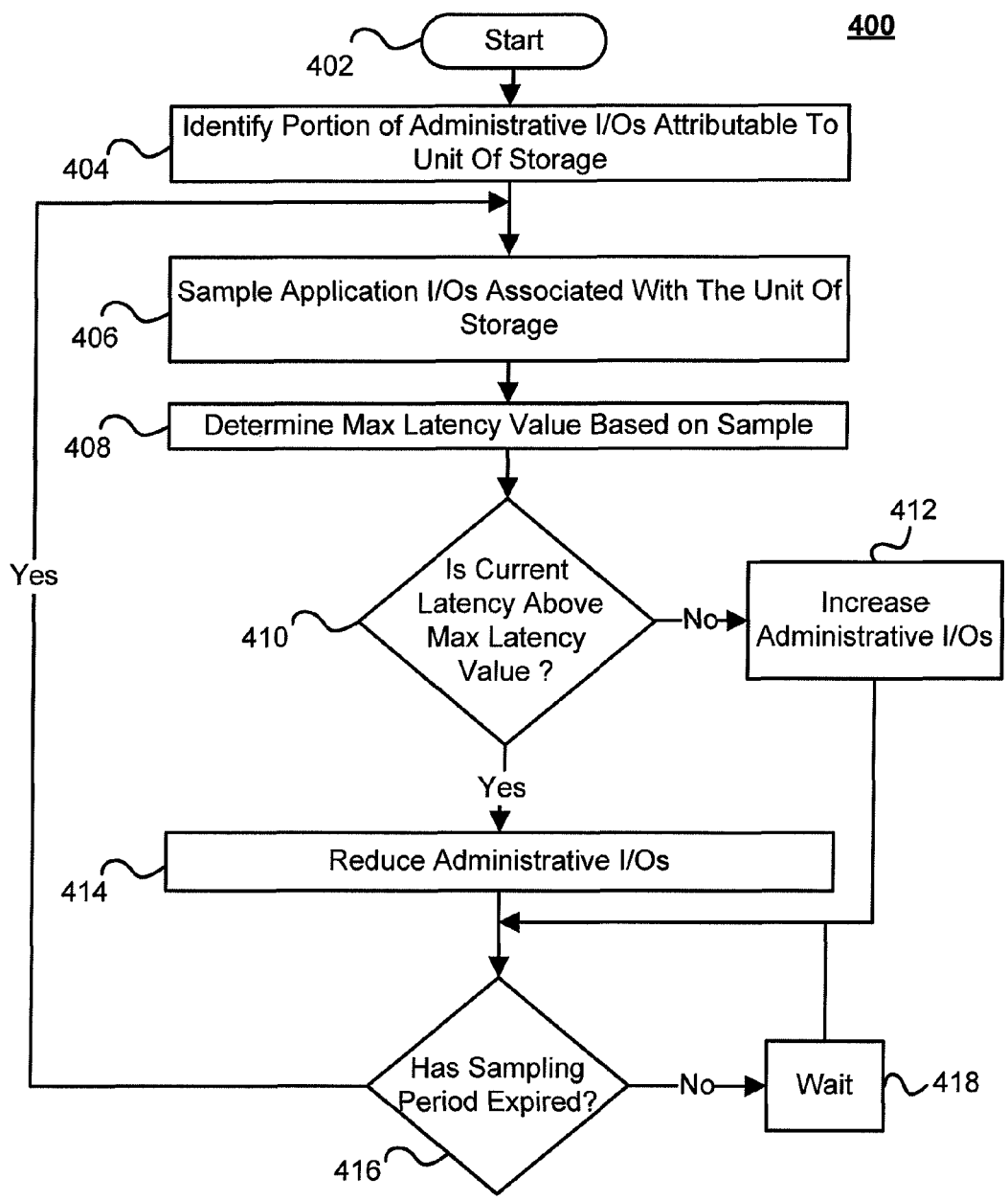
FIG. 4 depicts a method for storage network bandwidth management in accordance with an embodiment of the present disclosure.

Referring to FIG. 4, there is depicted a method 400 for storage network bandwidth management in accordance with an embodiment of the present disclosure. At block 402, the method 400 may begin.

At block 404, a portion of I/Os attributable to one or more units of storage. Logical volume management software and/or a storage network bandwidth management module may be configured to identify administrative I/O requests attributable to particular units of storage. This may allow management of bandwidth such as throttling of administrative I/O requests in response to a heavy I/O load on one or more particular units of storage. Throttling of I/O requests may allow an application using a particular unit of storage to avoid degraded performance. According to some embodiments, a particular level of service may be specified for an application and administrative I/Os may be throttled accordingly. A level of service may specify peak and off-peak times allowing I/O intensive actions to be scheduled accordingly. Storage network bandwidth management services may be provided for a plurality of units of storage. According to some embodiments a unit of storage may be one or more of a volume, a disk, and a disk array.

At block 406, application Input/Output (I/O) requests associated with the unit of storage may be non-disruptively sampled during a specified period of time. A sample may be a specified number of packets, a specified percentage of packets, or another criteria designed to be of sufficient size to reasonably estimate latency of response times to I/O requests for an application associated with the unit of storage. According to some embodiments, administrative I/O requests may be differentiated from application I/O requests based on a field in a packet header of administrative I/O request packets. Sampling may be configured so as to avoid degrading performance further.

At block 408, a maximum latency value for the sampling period may be determined. For example, a maximum latency value may be specified as a percentage of an average observed latency during a sampling period (e.g., 120%). A maximum latency value may also be specified in another manner (e.g., a table mapping sampled latency ranges to maximum latency values, a table mapping a number of I/O requests to a maximum latency value, etc.)

At block 410, a maximum latency value may be compared with a current latency value. If a current latency value exceeds a maximum latency value then method may continue at block 414. If a current latency value is below a maximum latency value then method may continue at block 412.

At block 412, in the event a current latency value is a specified level below a maximum latency value, administrative Input/Output (I/O) requests may be increased.

Increases in administrative Input/Output (I/O) requests may be proportional to an amount a currently observed application I/O latency falls below a maximum specified I/O latency. For example, if application I/O latency is twenty percent below a specified maximum application I/O latency, then administrative I/O requests may be increased by twenty percent. According to some embodiments, a margin may be left (e.g., the administrative I/O may be increased by only 10% and a 10% safety margin may be left). Increases in administrative I/O requests may also be calculated using other factors (e.g., a mapping table, a cap, etc.)

According to some embodiments, if a current latency value is below a maximum latency value the method may continue at block 416 without increasing administrative I/O requests.

At block 414, administrative I/O requests may be throttled. According to one or more embodiments, throttling administrative I/O requests may be implemented using a sliding window protocol.

According to one or more embodiments, the latency values of more than one unit of storage when managing administrative I/O bandwidth use. For example, a current latency value of a second unit of storage may be compared with a maximum latency value associated with a second unit of storage. Throttling administrative I/O requests may include throttling administrative I/O requests in the event that the current latency value exceeds either the maximum latency value of the first unit of storage or the maximum latency value of the second unit of storage. Latency of one or more units of storage may be compared with one or more current latency values based upon an administrative operation occurring which writes from the first unit of storage to the second unit of storage. Administrative I/O requests of operations involving a plurality of units of storage may be throttled to address a lowest latency value of the plurality of units of storage (e.g., administrative I/O requests associated with migration of data from a first disk array to a second disk array may be throttled to the lowest acceptable maximum latency of the two disk arrays).

Throttling administrative I/O requests in the event that a current latency value exceeds the maximum latency value may include decreasing administrative I/O requests at a rate proportional to a rate at which the current latency value exceeds the maximum latency value. For example, if a current latency value exceeds a maximum latency value by ten percent, administrative I/O requests may be decreased by ten percent. Throttling administrative I/O requests may also use other calculations such as, for example, mapping a current latency value to a specified number of administrative I/O requests.

Throttling administrative I/O requests may use one or more methods. For example, tokens or a sliding window, weighted queuing, and/or a weighted round robin methodology may be used.

At block 416, it may be determined whether a sampling period has expired. For example, threshold or reference latencies may be determined by sampling periodically (e.g., every three hours). According to some embodiments, an administrative user may trigger a sampling of application I/O requests in order to determine a threshold (e.g., if a large migration is occurring). If a sampling period has expired the method may return to block 406. If a sampling period has not expired the method may wait at block 418.

At this point it should be noted that storage network bandwidth management in accordance with the present disclosure as described above typically involves the processing of input data and the generation of output data to some extent. This input data processing and output data generation may be implemented in hardware or software. For example, specific electronic components may be employed in a storage network bandwidth management module or similar or related circuitry for implementing the functions associated with storage network bandwidth management in accordance with the present disclosure as described above. Alternatively, one or more processors operating in accordance with instructions may implement the functions associated with storage network bandwidth management in accordance with the present disclosure as described above. If such is the case, it is within the scope of the present disclosure that such instructions may be stored on one or more processor readable storage media (e.g., a magnetic disk or other storage medium), or transmitted to one or more processors via one or more signals embodied in one or more carrier waves.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

The invention claimed is:

1. A method for storage network bandwidth management comprising:
    sampling, using a storage network bandwidth management component, application Input/Output (I/O) requests associated with a first unit of storage during a specified period of time, wherein the sampling is independent of volume management administrative I/O requests;
    determining a maximum latency value based on the sampling of the application Input/Output (I/O) requests;
    comparing the maximum latency value with a current application I/O latency value;
    throttling the volume management administrative I/O requests in the event that the current application I/O latency value exceeds the maximum latency value, wherein the volume management administrative I/O requests are independent of the application Input/Output (I/O) requests; and
    increasing the volume management administrative Input/Output (I/O) requests in the event the current application I/O latency value is a specified level below the maximum latency value, wherein the volume management administrative I/O requests are independent of the application Input/Output (I/O) requests and wherein a level of the increase is based upon an amount the current application I/O latency level is below the maximum latency value.

2. The method of claim 1, further comprising:
    periodically sampling the application Input/Output (I/O) requests to determine a new maximum latency value.

3. The method of claim 2, wherein the periodic sampling results in a plurality of stored maximum latency values used to identify bandwidth utilization trends.

4. The method of claim 1, wherein the first unit of storage comprises at least one of a volume, a disk, and a disk array.

5. The method of claim 1, wherein determining a maximum latency value based on the sampling of the application Input/Output (I/O) requests comprises specifying a maximum latency value based on a percentage of an average latency of the sampled application Input/Output (I/O) requests.

6. The method of claim 1, wherein throttling volume management administrative I/O requests in the event that the current application I/O latency value exceeds the maximum latency value comprises decreasing the volume management administrative I/O requests at a rate proportional to a rate at which the current application I/O latency value exceeds the maximum latency value.

7. The method of claim 1, further comprising:
    comparing the current application I/O latency value with a maximum latency value associated with a second unit of storage, wherein throttling volume management administrative I/O requests comprises throttling the volume management administrative I/O requests in the event that the current application I/O latency value exceeds either the maximum latency value of the first unit of storage or the maximum latency value of the second unit of storage.

8. The method of claim 7, wherein the comparison is based upon an administrative operation occurring which requires writing from the first unit of storage to the second unit of storage.

9. The method of claim 1, wherein throttling volume management administrative I/O requests is implemented using a sliding window protocol.

10. The method of claim 1, wherein I/O requests of an application are non-disruptively differentiated from the volume management administrative I/O requests based on a field in a packet header of volume management administrative I/O request packets.

11. At least one non-transitory processor readable storage medium for storing a computer program of instructions configured to be readable by at least one processor for instructing the at least one processor to execute a computer process for performing the method as recited in claim 1.

12. The method of claim 1, wherein the level of the increase is calculated to include a specified safety margin between administrative I/O requests and the maximum latency value.

13. An article of manufacture for storage network bandwidth management, the article of manufacture comprising:
    at least one non-transitory processor readable medium; and
    instructions stored on the at least one medium;
    wherein the instructions are configured to be readable from the at least one medium by at least one processor and thereby cause the at least one processor to operate so as to:
        sample application Input/Output (I/O) requests associated with a first unit of storage during a specified period of time, wherein the sampling is independent of volume management administrative I/O requests;
        determine a maximum latency value based on the sampling of the application Input/Output (I/O) requests;
        compare the maximum latency value with a current application I/O latency value; and
        throttle the volume management administrative I/O requests in the event that the current application I/O latency value exceeds the maximum latency value, wherein the volume management administrative I/O requests are independent of the application Input/Output (I/O) requests; and increasing the volume management administrative Input/Output (I/O) requests in the event the current application I/O latency value is a specified level below the maximum latency value, wherein the volume management administrative I/O requests are independent of the application Input/Output (I/O) requests and wherein a level of the increase is based upon an amount the current application I/O latency level is below the maximum latency value.

14. A system for storage network bandwidth management comprising:

one or more processors communicatively coupled to a network; wherein the one or more processors are configured to:

sample application Input/Output (I/O) requests associated with a first unit of storage during a specified period of time, wherein the sampling is independent of volume management administrative I/O requests;

determine a maximum latency value based on the sampling of the application Input/Output (I/O) requests;

compare the maximum latency value with a current application I/O latency value; and throttle the volume management administrative I/O requests in the event that the current application I/O latency value exceeds the maximum latency value, wherein the volume management administrative I/O requests are independent of the application Input/Output (I/O) requests; and increasing the volume management administrative Input/Output (I/O) requests in the event the current application I/O latency value is a specified level below the maximum latency value, wherein the volume management administrative I/O requests are independent of the application Input/Output (I/O) requests and wherein a level of the increase is based upon an amount the current application I/O latency level is below the maximum latency value.

15. The system of claim 14, wherein the one or more processors are further configured to:

periodically sample the application Input/Output (I/O) requests to determine a new maximum latency value.

16. The system of claim 14, wherein the first unit of storage comprises at least one of a volume, a disk, and a disk array.

17. The system of claim 14, wherein the one or more processors are further configured to:

compare the current application I/O latency value with a maximum latency value associated with a second unit of storage, wherein throttling volume management administrative I/O requests comprises throttling the volume management administrative I/O requests in the event that the current application I/O latency value exceeds either the maximum latency value of the first unit of storage or the maximum latency value of the second unit of storage.

18. The system of claim 17, wherein the comparison is based upon an administrative operation occurring which requires writing from the first unit of storage to the second unit of storage.

19. The system of claim 14, wherein throttling volume management administrative I/O requests is implemented using a sliding window protocol.

* * * * *